United States Patent [19]

Kogane et al.

[11] 4,286,869

[45] Sep. 1, 1981

[54] NEGATIVE FILM HANDLING METHOD AND APPARATUS

[75] Inventors: Mikio Kogane; Seiichi Yamazaki, both of Minami-ashigara, Japan

[73] Assignee: Fuji Photo Film Co., Ltd., Minami-ashigara, Japan

[21] Appl. No.: 105,484

[22] Filed: Dec. 20, 1979

[30] Foreign Application Priority Data

| | | | |
|---|---|---|---|
| Jan. 5, 1979 | [JP] | Japan | 54/870 |
| Mar. 6, 1979 | [JP] | Japan | 54/25748 |
| Jun. 18, 1979 | [JP] | Japan | 54/75667 |

[51] Int. Cl.[3] ........ G03B 27/62; G03B 27/32

[52] U.S. Cl. ........ 355/75; 281/8; 282/11.5 A; 355/77

[58] Field of Search ........ 355/40, 41, 50, 51, 355/64, 65, 75, 123, 77; 281/8; 282/11.5 R, 11.5 A, 16 R

[56] References Cited

U.S. PATENT DOCUMENTS

| | | | |
|---|---|---|---|
| 2,849,916 | 9/1958 | Nolan | 355/64 |
| 3,669,536 | 6/1972 | Scott | 355/75 X |
| 3,771,863 | 11/1973 | Muka | 355/40 X |
| 3,870,409 | 3/1975 | Abe | 355/75 |
| 4,049,255 | 9/1977 | Stange et al. | 355/75 X |
| 4,050,816 | 9/1977 | Stemmle | 355/75 |
| 4,055,381 | 10/1977 | Lauer et al. | 355/75 |
| 4,118,120 | 10/1978 | Ruffner et al. | 355/75 |
| 4,189,228 | 2/1980 | Farrell | 355/75 X |
| 4,412,794 | 3/1979 | Trump | 355/75 X |

*Primary Examiner*—Richard A. Wintercorn
*Attorney, Agent, or Firm*—Sughrue, Mion, Zinn, Macpeak & Seas

[57] ABSTRACT

A negative film handling method and apparatus in which negative films to be printed are inserted into negative film carrier sheets and the film sheets are attached side-by-side on a conveyor flexible transparent belt. Negative film inserting and removing openings provided in the film sheets are aligned with one another perpendicular to the inserting and removing direction. The negative film inserting and removing openings are opened by bending an edge portion of the flexible transparent belt.

27 Claims, 20 Drawing Figures

NEGATIVE FILM HANDLING METHOD AND APPARATUS

BACKGROUND OF THE INVENTION

The present invention relates to a negative film handling method and apparatus for processing negative film pieces, each having several frames, obtained by cutting the original negative film and contained in or inserted into a negative film containing bag (hereinafter referred to as "a negative sheet") are subjected to a process such as extra printing.

A developed negative film is returned to the customer, after being cut into shorter negative films (or negative film pieces) each having several frames. An order for extra printing is issued to a laboratory with negative film pieces inserted into a negative sheet along with an order slip upon which is entered the designation number of a frame to be printed, the finished picture size, the type of photographing paper, and the number of copies. In the laboratory, the designation number on the order slip is collated with the side print number of the negative film piece and data concerning the negative film frame on request is inputted to a recording means so that, when the frame is supplied to the printer, the data is successively outputted from the recording means for controlling the necessary printing operation.

For extra printing of this type the following negative film handling methods have been previously known.

(1) A first negative film handling method in which negative film pieces are taken out of the negative sheet and are then spliced into a long negative film or "original" negative film.

(2) A second negative film handling method in which, as disclosed in Japanese Laid-Open Patent Application No. 131717/1977, negative film pieces are arranged end to end between two transparent belts to provide the original long negative film.

(3) A third negative film handling method in which a negative film piece is taken out of the negative sheet and is inserted into the negative sheet after printing.

This invention relates to an improvement of the third negative film handling method described above.

With respect to the third method, there has been proposed in Japanese Laid-Open Patent Application No. 82336/1977 "an automatic negative film processing device" in which the negative sheet is opened to deliver a negative film piece to the printing section. After printing, the negative film piece is put back into the negative sheet.

Furthermore, in order to uniformly record data concerning the frames of the negative film pieces on the negative sheet, Japanese Laid-Open Patent Application No. 51730/1978 has disclosed a method in which the negative sheets are successively stuck into a roll-shaped belt including recording means with the negative sheets are disposed perpendicular to the roll-shaped belt.

SUMMARY OF THE INVENTION

An object of this invention is to provide a negative film handling method by which insertion and removal of negative film pieces in the above-described method in which negative sheets are successively attached to a roll-shaped belt can be readily achieved.

Another object of the invention is to provide an automatic negative film handling device in which a negative film piece is automatically taken out of the negative sheet and delivered to the printing section and is inserted into the negative sheet after printing.

In a compound member including a flexible transparent belt and negative sheets into which negative film pieces have been inserted, according to the invention, the negative sheets are attached side-by-side on the lower surface of the flexible transparent belt in such a manner that the negative film inserting and removing openings of the negative sheets are in alignment with the longitudinal edge of the flexible transparent belt.

Provided by the invention is a negative film handling method in which negative sheets, namely carrier sheets, into which negative films are inserted are attached side-by-side to a flexible transparent belt in such a manner that the negative film inserting and removing openings of the negative sheets are aligned with one another perpendicularly to the negative film inserting and removing direction and in which according to the invention the negative film inserting and removing openings of the negative sheets are opened by bending the edge portion of the flexible transparent belt.

Provided according to another aspect of the invention is a negative sheet handling method in which a side portion or piece of the negative film inserting and removing opening of a negative sheet, which side piece is on the unattached side of the negative sheet, is joined to a side piece of the negative film inserting and removing opening of an adjacent negative sheet, the latter side piece being on the unattached side of the adjacent negative sheet.

Provided for practicing the above-described methods according to the invention is an automatic negative sheet handling apparatus for a picture printing device in which, in the course of delivering a negative film piece from the negative sheet and inserting the negative film piece into the negative sheet after the negative film piece has passed through the printing opening, the pictures of the negative film pieces passing through the printing opening are successively printed on a roll-shaped photographic paper. This apparatus includes:

(a) a negative film conveying means or device for intermittently conveying the negative sheets which contain the negative films and are attached to the flexible transparent belt;

(b) a negative sheet opening device for bending upwardly the upper side piece on the negative film inserting and removing opening side of the negative sheet and one edge portion on the negative film inserting and removing opening side of the flexible transparent belt and bending the lower side piece of the negative sheet downwardly to open the negative film inserting and removing opening;

(c) a negative film conveying path disposed perpendicularly to the direction of conveyance of the negative sheets to convey each negative film to the printing section;

(d) a negative film removing position regulating device for regulating, under the conditions that the negative film removing and inserting opening of the negative sheet is opened and the end portion of the negative film protrudes horizontally from the opening, the position of the negative film so as to convey the negative film in the direction parallel to the negative film conveying path coupled to the printing section with the negative film longitudinal center line coincident with the longitudinal center line of the conveying path;

(e) a negative film removing and inserting device for taking the negative film thus positioned onto the negative film conveying path and inserting the negative film into the negative sheet after printing;

(f) a negative film picture detection notch detecting device having means for detecting a picture of the negative film to feed the negative film as required to the printing section; and (g) a negative film feeding device for feeding the negative film uniformly to the printing section.

The devices described in paragraphs (c), (e), (f) and (g) above form an automatic negative film carrier which is movable to set a manual negative film carrier.

The foregoing objects and other objects of the invention will become more apparent from the following detailed description and the appended claims when read in conjunction with the accompanying drawings in which like parts are designated by like reference numerals or characters.

DETAILED DESCRIPTION OF THE INVENTION

Figure 1:
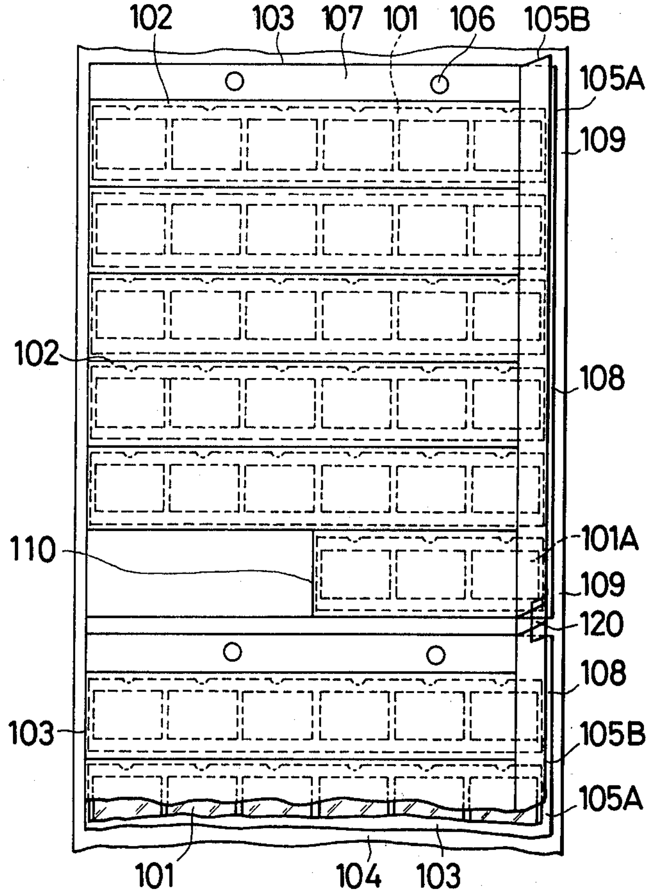
FIG. 1 is a plan view showing negative sheets attached to a flexible transparent belt.

FIG. 1 shows a flexible transparent belt 104 to which negative sheets 103 are attached. Each negative sheet has film containing sections 102 into which negative film pieces obtained by cutting a negative film are inserted. The negative sheet 103 includes the above-described pocket-shaped film containing sections 102 into which negative film pieces are inserted. Side pieces 105A and 105B are provided at both ends thereof so that a negative film piece 101 can be readily inserted into and removed from the containing section 102. Included also is a binding section 107 with binding holes 106 which is used to bind the negative sheet. The negative sheets 103 are attached side-by-side on the flexible transparent belt 104 in such a manner that the film inserting and removing openings 108 thereof are in alignment with one side of the flexible transparent belt 104. That is, they are arranged in a direction perpendicular to the film inserting and removing direction. The negative sheet 103 should be attached to the flexible transparent belt 104 so that when the belt 104 is conveyed, one of the side pieces 105A and 105B follows the movement of the belt 104. The negative sheet 103 may be attached to the belt using a locking member or by welding or use of an adhesive. In the case of using an adhesive for attaching the negative sheet 103 to the belt 104, an adhesive layer may be formed on the flexible transparent belt in advance. In this embodiment, a double-sided adhesive tape is employed. Most often, each negative film piece 101 has six frames. That is, the original negative film is cut into negative film pieces each having six frames. In some other cases, the negative film piece 101A may have only three frames which is shorter than the aforementioned negative film piece 101. In this case, as proposed by Japanese Patent Application No. 45415/1977 filed by the present applicants, a stopper 110 is provided in the negative film inserting path of the film containing pocket 102. The flexible transparent belt 104 on which the negative sheets 103 are successively placed can be wound so that it can be handled as a roll.

Sometimes, after the negative sheets 103 have been placed side-by-side on the flexible transparent belt 104 as described avove, the side piece 105B which is not attached to the flexible transparent belt 104 is bonded to the side piece of the adjacent negative sheet 103 by a bonding member 120 such as adhesive tape.

According to the invention in which the side pieces 105B which are not attached to the flexible transparent belt 104 are bonded to one another as described above, the side pieces 105A and 105B can be readily opened when the negative sheet 103 is inserted into or removed from the negative film containing pocket through the negative film inserting and removing opening 108.

Figure 2:
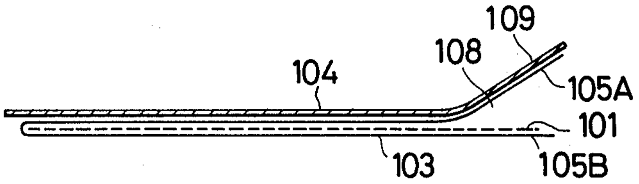
FIG. 2 through FIG. 4 are sectional views showing various states of the negative film inserting and removing opening of the negative sheet.

FIG. 2 is a sectional view of the negative film inserting and removing opening of the negative sheet 103 which is opened according to a negative film handling method of the invention. The edge portion 109 of the flexible transparent belt 104 can be sent by using a guide member which gradually bends the edge portion 109 as the flexible transparent belt 104 is unwound and moved longitudinally. In addition, the edge portion 109 may be sent by use of a suction device. As the edge portion 109 of the transparent belt 104 is bent as described above, one side piece 105A of the negative film inserting and removing opening 108 of the negative sheet 103 is also bent so as to make the opening 108. In order to cause the side piece 105A to follow the edge portion 109 which is being bent, at least one portion of the side piece 105A is retained to the flexible transparent belt 104.

Figure 3:
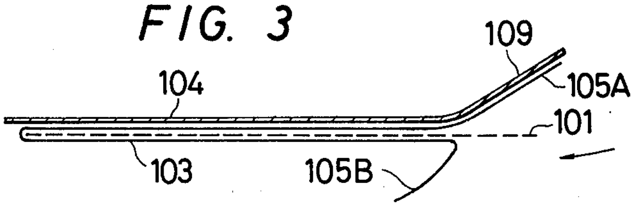

FIG. 3 is a sectional view showing another example of the negative film inserting and removing opening 108 which is provided as described with reference to FIG. 2 in which the side piece 105 is also bent to facilitate the insertion and removal of the negative film piece 101. The side piece 105B can be readily bent by blowing air in the direction of the arrow or by using a suction device.

When the opening 108 is made as shown in FIG. 2, the negative film piece 101 can be taken out of the negative sheet 103 by removing it with a suction device or a roller. In the case when the opening 108 is made as shown in FIG. 3, then the negative film piece 101 can be taken out by a method of holding it with the fingers in addition to the above-described method. The negative film piece can be inserted into the negative sheet 103 in the same manner.

Figure 4:
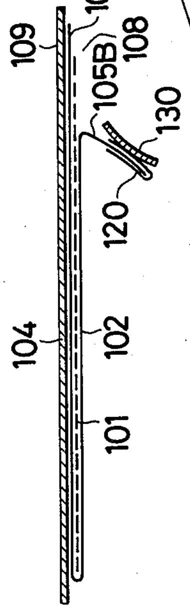

FIG. 4 is a sectional view for a description of a method of readily opening the negative film inserting and removing opening 108 according to the invention. In this case, the side piece 105B is bent by gas blowing, suction due to pressure reduction, or by mechanical means to open the negative film inserting and removing opening 108. As the flexible transparent belt 104 moves, the bent side piece 105B is guided by a guide member 130 to a position where the negative film piece is inserted or removed. In this case, the side pieces 105B of adjacent negative sheets are bonded to one another by the bonding member 120. Therefore, if the side piece 105B of the first negative sheet is bent by utilizing negative pressure or mechanically, the remaining side pieces 105B can be automatically bent by the guide member 130.

In order that, while the flexible transparent belt 104 with the negative sheets placed thereon is being conveyed in the longitudinal direction, the negative sheets are successively stopped at the negative film piece 101 inserting and removing position, marks are provided at predetermined positions on the film containing pockets 102 of each negative sheet 103. The marks are detected and used for controlling the conveying mechanism of the flexible transparent belt.

Furthermore, this operation may be implemented by a method in which the position of the joint of adjacent negative sheets is detected and the flexible transparent belt is stopped at the position of each film containing pocket 102 as determined by this position.

The negative film handling method according to the invention is as described above. Accordingly, the invention has a meritorious effect in that the negative film piece can be readily inserted into and removed from the film containing pocket by the negative film handling method in which the negative sheets are arranged side-by-side on the flexible transparent belt. Especially, according to the invention, the negative film inserting and removing opening of the negative sheet can be readily opened while the flexible transparent belt is being conveyed. Thus, the method of the invention is suitable for automating the handling of negative films.

An automatic negative film handling device for practicing the above-described method according to the invention will next be described in detail.

Figure 5:
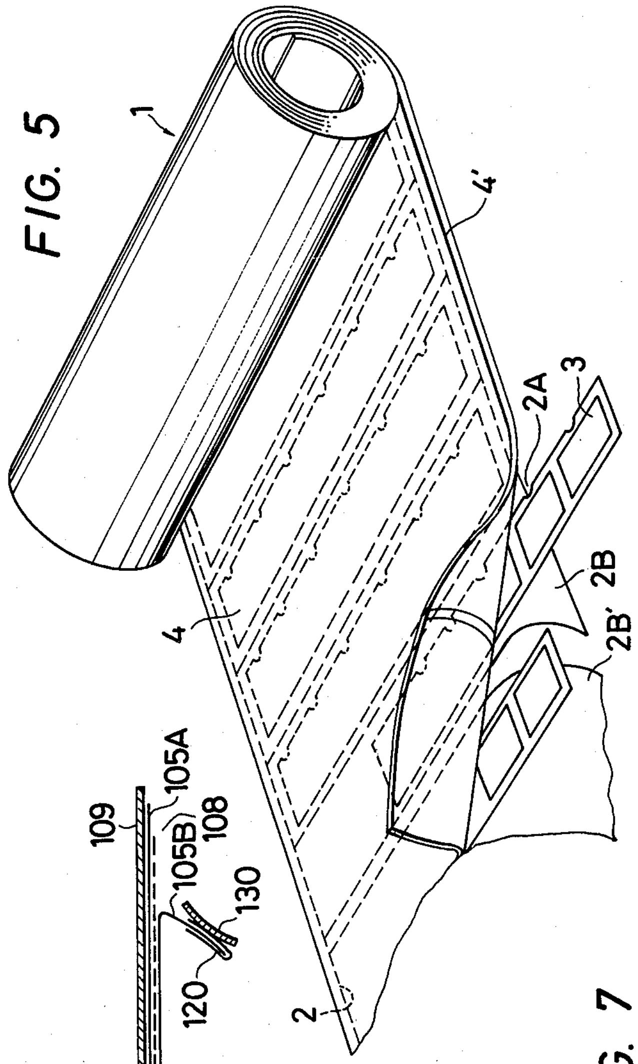
FIG. 5 is a perspective view illustrating a compound member including the flexible transparent belt and the negative sheets which contain the negative film pieces and are attached to the flexible transparent belt.

In FIG. 5, reference numeral 1 designates a flexible transparent belt 4 wound in the form of a roll. Negative sheets 2 include negative film pieces 3 obtained by cutting the original negative film. The film inserting and removing sections of the negative sheets 2 containing the negative film pieces 3 are successively arranged along the longitudinal edge 4' of the flexible transparent belt 4 and inwardly of the longitudinal edge 4'. The negative sheets 2 are attached to the flexible transparent belt 4. Each negative sheet 2 has a plurality of pockets into which negative film pieces 3 are inserted. The upper side piece 2A of the negative film inserting and removing opening of the negative sheet 2 is bonded to the flexible transparent belt 4 through a double-sided adhesive tape, for example. The upper side pieces of two adjacent negative sheets may be bonded to the flexible transparent belt by laying a single-sided adhesive tape over the space between the two negative sheets. However, it is unnecessary to connect the lower side pieces 2B and 2B' of the negative film inserting and removing openings of the two negative sheets with such a tape.

The flexible transparent belt employed for use with the invention may be made of a material such as a polyester or plastic film which can withstand the repetitive bending of the edge portions. It is preferable that the negative sheet be such that one of the side pieces of the negative film inserting and removing opening thereof is longer than the other. However, the configuration of the negative sheet may be otherwise. In any case, the configuration should be such that when one side piece follows the bending of the edge portion of the flexible transparent belt the other side piece is maintained as it is. That is, it is necessary that the side pieces of the negative film inserting and removing opening be independent of each other. This may be achieved by the following method. A small force is applied to a portion near the film inserting and removing opening of the heat-welded line for forming the pocket in the negative sheet so as to divide it into two parts thereby to form the upper and lower side pieces 2A and 2B having the necessary degrees of freedom.

Figure 6:
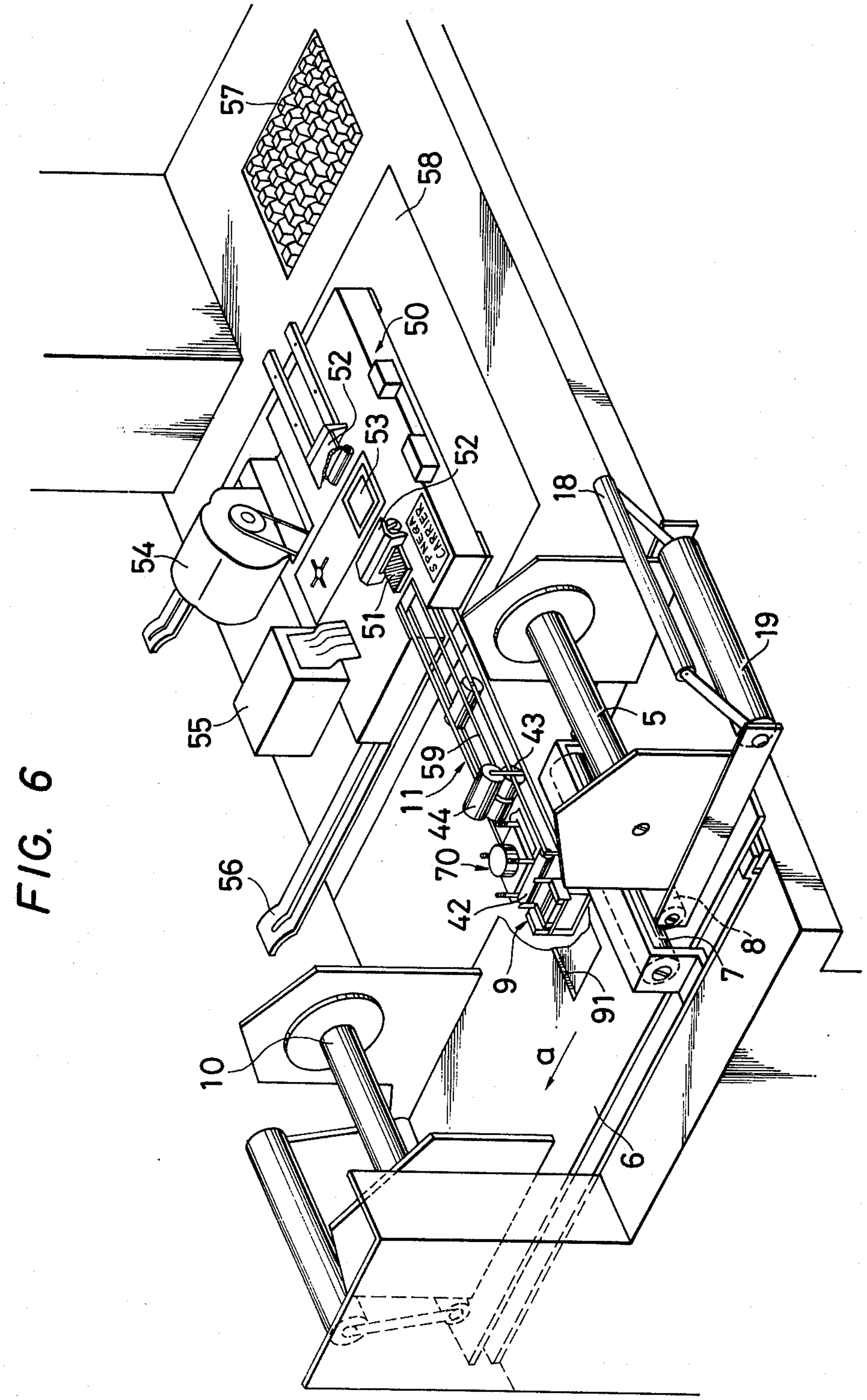
FIG. 6 is a perspective view showing an automatic negative film handling device according to the present invention.

FIG. 6 is a perspective view showing essential components of an automatic negative film handling device according to the invention.

A compound member constructed of negative sheets containing negative film pieces and a flexible transparent belt to which the negative sheets are attached is wound on a negative sheet supplying magazine 5 in such a manner that, when the compound member is conveyed, the flexible transparent belt is positioned above. The compound member 1 is supplied from the magazine 5 and is then conveyed in the direction of the arrow a through a dancer roller 18 and a guide roller 19 by a drive roller 7. The device further includes a stationary roller 8, a negative film removing position regulating section, a negative sheet winding magazine, and a negative film conveying path 11 which has a negative film conveying surface which is at the same level as that of a conveying stand 6. The negative film conveying path 11 extends perpendicularly to the conveying stand 6 and is connected to a negative film carrier or a printing frame 50. The body of the negative film removing position regulating section 9 is below the conveying stand 6 and a negative film removing and inserting section 70 is provided downstream of the negative film conveying path 11.

Figure 7:
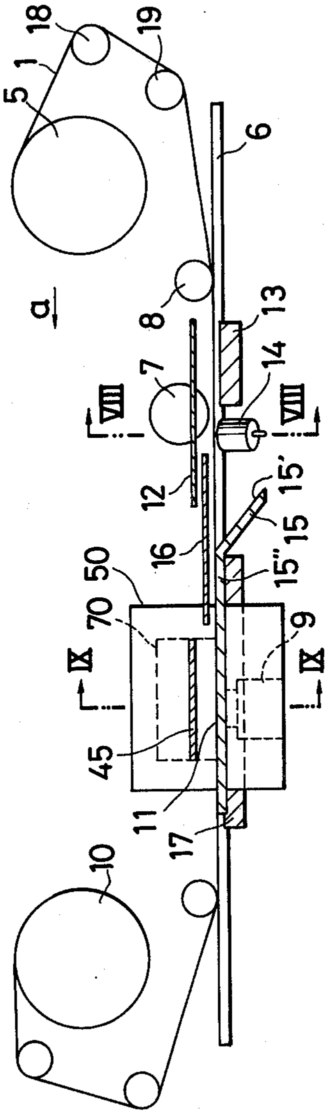
FIG. 7 is a front view outlining the arrangement of the device shown in FIG. 6.

As shown in FIG. 7, according to the invention, the negative film piece can be readily taken out of the negative sheet by the combination of a first guide plate 12, a second guide plate 13, a direction changing roller 14, a third guide plate 15, a fourth guide plate 16 and a fifth guide plate 17, all of which are provided between the stationary roll 8 and the negative film removing position regulating section 9 and along the edge of the conveying stand on the negative film carrier side.

The first guide plate 12 is disposed substantially in parallel with the conveying stand in such a manner that it confronts the edge portion of the conveying stand 6 and is above the conveying stand 6. The first guide plate 12 extends in the conveying direction between the second guide plate 13 and the fourth guide plate 16. The second guide plate 13 is disposed substantially below the first guide plate 12 in such a manner as to confront the edge portion of the conveying stand 6. The second guide plate 13 operates to separate the negative film piece 3 and the lower side piece 2B of the negative sheet from a single unit including the flexible transparent belt 4 and the upper side piece 2A of the negative sheet shown in FIG. 5. More specifically, the edge portion of the flexible transparent belt 4 and the upper side piece 2A of the negative sheet are bent upwardly by the first guide plate while the end portion of the negative film piece 3 and the lower side piece 2B of the negative sheet are bent downwardly into the gap between the edge portion of the conveying stand and the second guide plate 13. That is, the second guide plate 13 is so shaped that, as the compound member 1 is conveyed, the end portion of the negative film piece 3 and the lower side piece 2B of the negative sheet are gradually deflected downwardly.

The direction changing roller 14 is disposed in such a manner that it is adjacent to the second guide plate and downstream of the second guide plate 13 and that it confronts the edge portion of the conveying stand 6. The direction changing roller 14 operates to separate the lower side piece 2B of the negative sheet 2 and the end portion of the negative film piece 3 as a single unit from the assembly of the flexible transparent belt 4 and the upper side piece 2A thereby introducing the negative film piece 3 from the negative film removing position regulating section 9 to the negative film conveying path 11.

Figure 8:
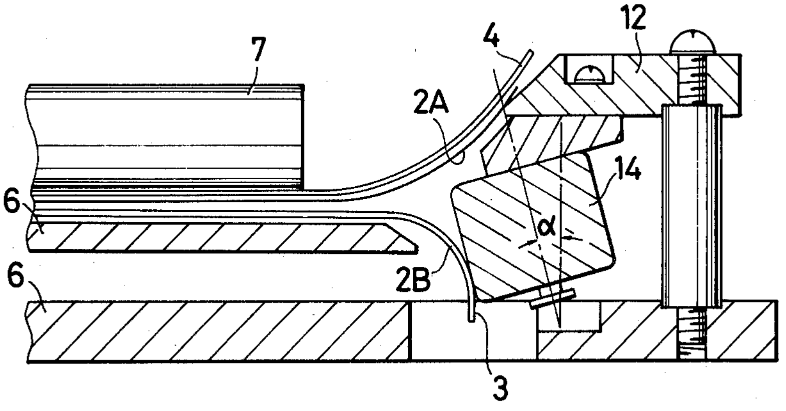
FIG. 8 is a sectional view taken along line VIII—VIII in FIG. 7.

As shown in FIG. 8, the shaft of the direction changing roller 14 is fixedly secured to the conveying stand 6 forming an angle $\alpha$ with the direction of the conveying stand 6 so that the lower side piece 2B of the negative sheet and the end portion of the negative film piece 3 are bent downwardly into the gap between the conveying stand 6 and the direction changing roller 14 and the upper side piece 2A of the negative sheet and the end portion of the flexible transparent belt 4 are maintained bent upwardly.

The third guide plate 15 and the fourth guide plate 16 are arranged downstream of the direction changing roller 14. More specifically, the third guide plate 15 is so disposed that its end farthest upstream is spaced more than the width, most commonly 35 mm, of at least one negative film from the direction changing roller 14 and the end farthest downstream extends to the negative film removing position regulating section 9. The farthest upstream end portion of the third guide plate 15 is below the end portion of the negative film piece 3 which was bent downwardly by the direction changing roller 14 thus forming a sloped surface 15' whose height increases gradually towards the downstream direction. Furthermore, in the vicinity of the negative film removing position regulating section 9, the third guide plate 15 has a horizontal surface 15" which is flush with the negative film removing position so that the negative film passes over the upper surface so as to be introduced to the negative film removing position regulating section.

The fourth guide plate 16 extends from a position immediately downstream of the direction changing roller 14 to a position immediately in front of the negative film removing position regulating section 9 below the first guide plate 12 and above the compound member being conveyed so as to prevent the end portion of the negative film piece from being deflected upwardly by being released from the direction changing roller 14.

Figure 9:
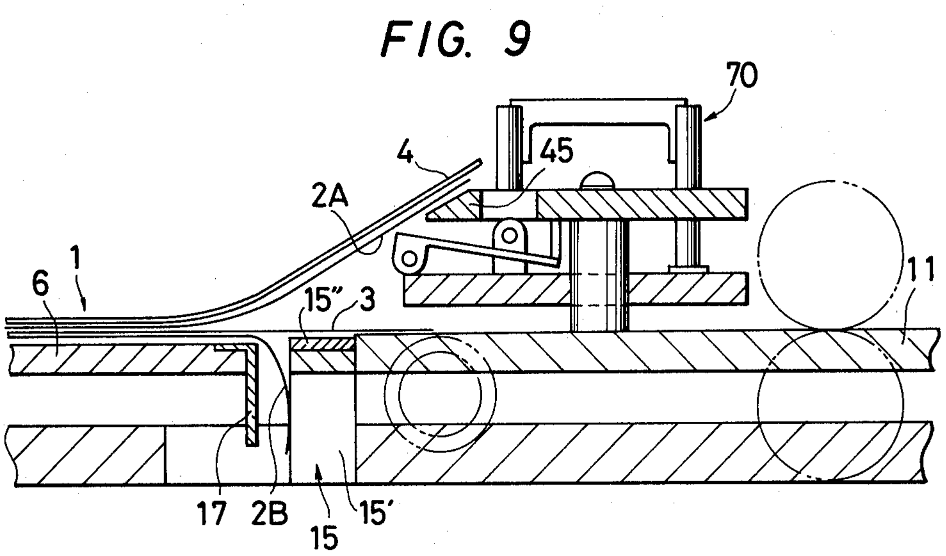
FIG. 9 is a sectional view taken along line IX—IX in FIG. 7.

The fifth guide plate 17 is provided on the side of the conveying stand 6 substantially confronting the third guide plate 15 so as to maintain the lower side piece 2B of the negative film bent downwardly. That is, the negative sheet lower side piece 2B is maintained bent downwardly in the gap between the third guide plate 15 and the fifth guide plate 17 as shown in FIG. 9. In FIG. 9, reference numeral 45 designates a sixth guide plate which is provided for a negative film inserting and removing section 70 positioned near the negative film removing position regulating section 9. This guide plate is equal in height to the first guide plate 12. The combined guide means operate so that when a negative film piece for printing reaches the negative film removing position near the entrance of the negative film conveying path 11, the negative sheet upper side piece and the flexible transparent belt to which it is attached are bent upwardly while the negative sheet lower side piece is bent downwardly whereby the end portion of the negative film piece extends horizontally to protrude from the negative film removing opening.

In accordance with the invention, a groove 91 having a width greater than the width of a negative film may be formed in the conveying surface of the conveying stand 6 at the negative film removing position so that when a negative film piece reaches the negative film removing position a space is provided to more easily open the negative sheet, that is, to further open the negative film removing opening of the negative sheet.

Figure 10:
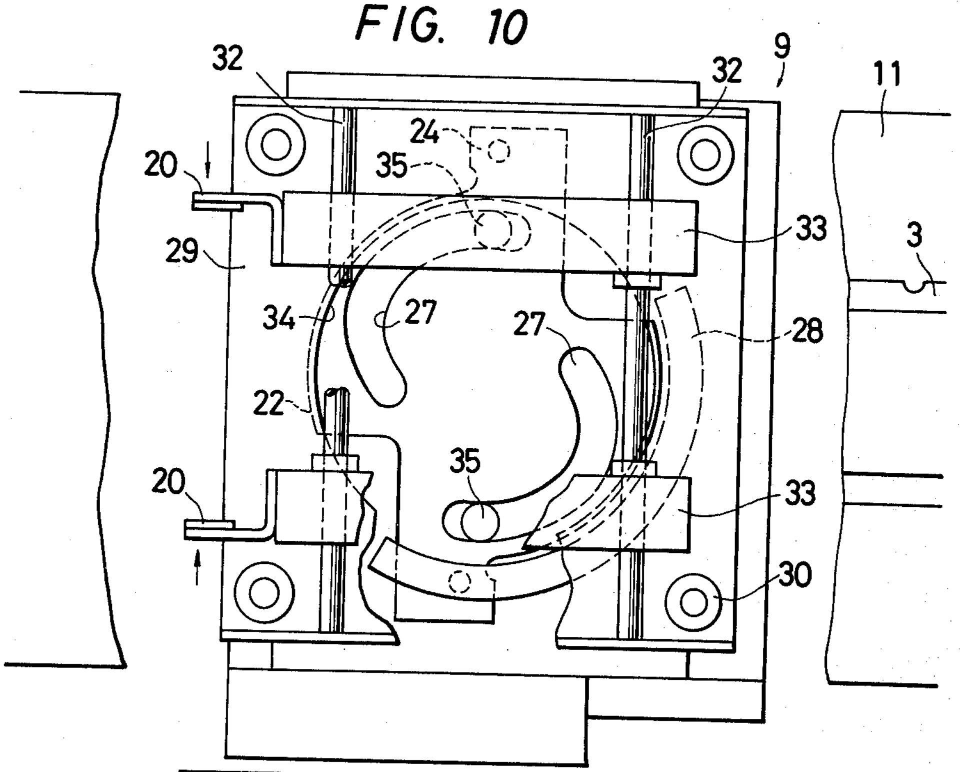
FIG. 10 is a plan view of a negative film removing position regulating device according to the invention.
Figure 11:
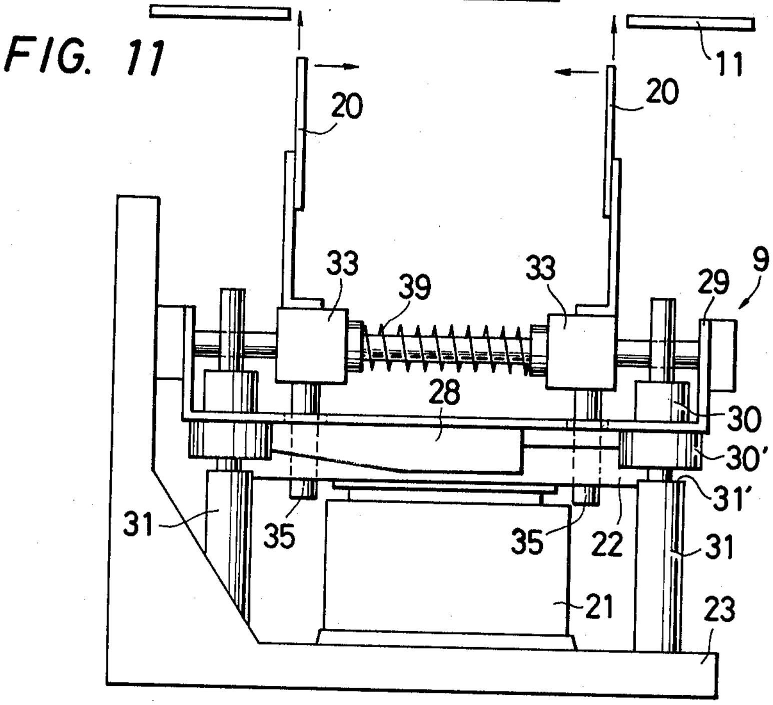
FIG. 11 is a front view of the negative film removing position regulating device according to the invention.
Figure 12:
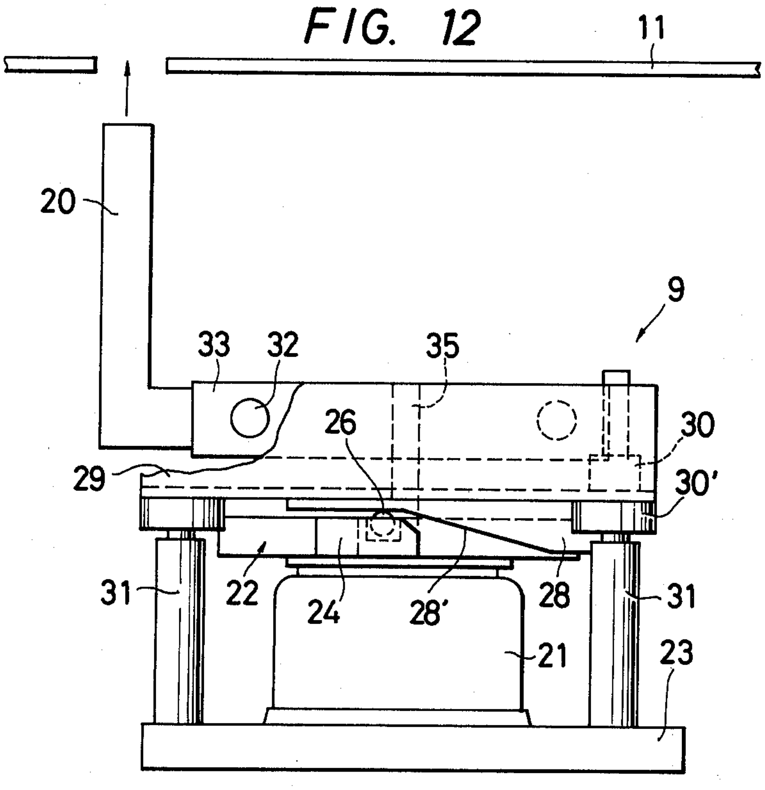
FIG. 12 is a side view of the negative film removing position regulating device according to the invention.
Figure 13A:
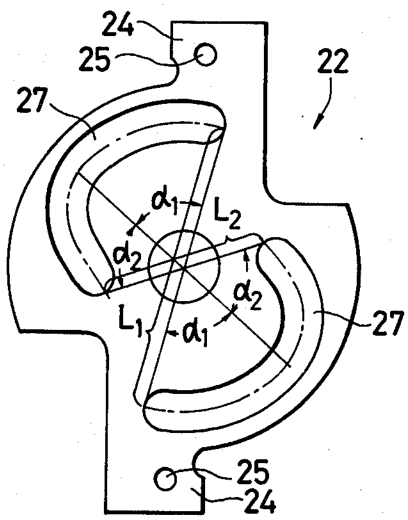
FIG. 13A is a plan view of a guide plate employed in the negative film removing position regulating device according to the invention.
Figure 13B:
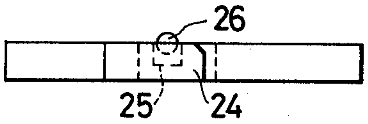
FIG. 13B is a front view of the guide plate shown in FIG. 13A.

The negative film removing position regulating device according to the invention includes a positioning regulator which, under the conditions that the edge portion of the flexible transparent belt is bent and the negative film inserting and removing opening formed by the upper and lower side pieces of the negative sheet is opened, sets the end of a negative film piece protruding from the opening in parallel with the negative film conveying path, and aligns the negative film longitudinal center with the conveying path longitudinal center. The arrangement of this device is as shown in FIGS. 10 through 12.

The body 9 of the negative film removing position regulating device is positioned below the negative film conveying path 11 and a pair of slide plates 20 are provided protruding over the negative film conveying path for regulating the position of a negative film. A rotary solenoid 21 is fixedly secured to a stand 23 and holds a guide plate 22. The guide plate 22, as shown in FIGS. 10 through 13A and 13B, has a protruding part 24 in which a pair of recesses 25 are formed. Two steel balls 26 are incorporated in the recesses 25, respectively. In addition, a pair of arcuate holes 27, to be described, are formed in the protruding part 24.

Figure 14A:
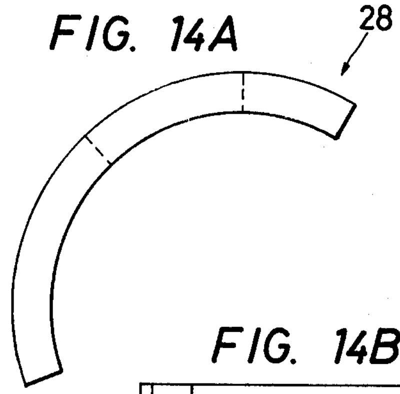
FIG. 14A is a plan view of a cam used in the negative film removing position regulating device according to the invention.
Figure 14B:
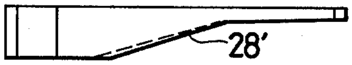
FIG. 14B is a front view of the cam shown in FIG. 14A.

The steel ball 26 in the recess 25 of the protruding part 24 is in slide contact with the cam surface 28' of a cam 28 which is fixedly secured to the lower surface of a table 29 as shown in FIGS. 14. The slope surface of the cam surface is so shaped that the upper ends of the pair of slide plates 20 protrude over the negative film conveying path 11 and extend downwardly to at least the film conveying surface of the negative film conveying path.

The upper and lower surfaces of the table 29 are held by stationary members 30 and 30', respectively. The stationary members 30 and 30' are slidable with respect to four supporting members 31 which are held vertical on the stand 23. Each supporting members 31 has a shoulder 31' which determines the lowermost position of the stationary member 30'.

The table 29 is provided with a pair of parallel slide shafts 32 on which a pair of sliders 33 are slidably mounted. The above-described pair of slide plates 20 is fixedly secured to the ends of the sliders 33 and extending upwardly. The table 29 has a circular hole 34. Each slider 33 has an engaging rod 35 extending downwardly. The engaging rod 35 extends through the circular hole 34 and is engaged with the arcuate hole 27 in the guide plate 22. In FIG. 11, reference numeral 39 designates a compression spring provided between the sliders 33 over the slide shafts. The compression spring 39 energizes the sliders 33 to urge them away from each other.

As shown in FIGS. 13, the arcuate holes 27 formed in the guide plate 22 have a diameter $L_1$ for the rotational angle $\alpha_1$ of the guide plate 22 provided by the rotary solenoid and a diameter $L_2$ for the rotational angle $\alpha_2$. The rotational angle $\alpha_1$ corresponds to the width, usually about 44 mm, of a negative film containing pocket of the negative sheet into which a negative film piece is inserted while the rotational angle $\alpha_2$ corresponds to the width, usually about 35 mm, of the negative film piece. The steel ball 26 in the recess 25 of the protruded part 24 of the guide plate 22 is in slide contact with the cam surface the configuration of which is such that, when the rotational angle $\alpha_1$ of the guide plate 22 is shifted to the rotational angle $\alpha_2$, the steel ball 26 moves to the left sliding along the sloped surface as viewed in FIG. 14B thereby lifting the table 29 and accordingly the slide plates 20.

Figure 15:
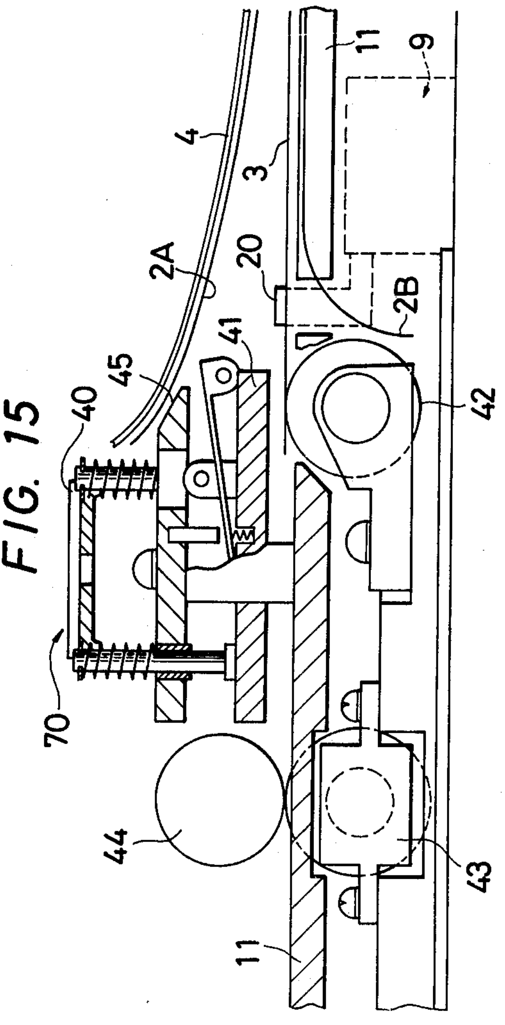
FIG. 15 is a side view of a negative film inserting and removing device according to the invention.

The negative film removing and inserting device 70 as shown in FIG. 15 is provided downstream of the negative film removing position regulating device 15 in the negative film conveying path 11. The negative film removing and inserting device 70 includes a solenoid 40, a press member 41 which is moved up and down by the solenoid 40, a negative film removing and inserting roller 42, and feed rollers 43 and 44.

The end portion of a negative film piece 3 is sandwiched by the press member 41 and the negative film removing and inserting roller 42. By means of the elements 41 and 42, the negative film piece 3 is conveyed to the left as viewed in FIG. 15 and is introduced through the feed rollers 43 and 44 to a negative film carrier section 50. In FIG. 15, reference numeral 45 designates a guide plate adapted to maintain the flexible transparent belt 4 and the negative sheet upper side piece 2A which is integral with the belt 4 bent upwardly.

An automatic negative film carrier device constructed according to the invention includes the negative film conveying path 11, a negative film picture notch detecting section 51, a negative film delivery driving section 52, and a masking section 53. As described previously, the negative film conveying path is formed as a guide path which introduces a negative film piece 3 to the masking section 53 where printing is carried out and the negative film piece 3 is inserted into the negative sheet 2 after exposure. The negative film piece is conveyed by a belt.

The negative film picture notch detecting section 51, which may be constructed as disclosed in Japanese Patent Application No. 9673/1978 entitled "Picture Frame Detection and Stop Device", includes a data processing device in which, in order to determine the width of a frame and the position of a frame, data-processed signals are applied to the negative film delivery drive section 52 to successively stop the frames at the frame stopping position. In the negative film delivery drive section 52, the negative film piece is controllably delivered to the masking section 53 in response to information provided by the negative film picture notch detecting section 51.

In FIG. 6, reference numeral 54 designates a drive motor for driving a negative film removing and inserting system including the negative film removing and inserting roller 42 and the negative film delivery drive section 52, reference numeral 55 designates a notch detecting light source, and 57 a key-board. The picture of a negative film piece passing through the masking section 53 is printed by an optical system (not shown) on a roll of photographic paper which is conveyed in the same direction as the negative film piece and parallel with the picture of the negative film piece below the body of the automatic negative film handling device.

In FIG. 6 reference numeral 56 designates guide plates for sliding the automatic negative film carrier section. In accordance with the present invention, a manual negative film carrier can be positioned on a carrier plate 58 after the automatic negative film carrier has been set back in order to manually process a negative film piece.

Figure 16:
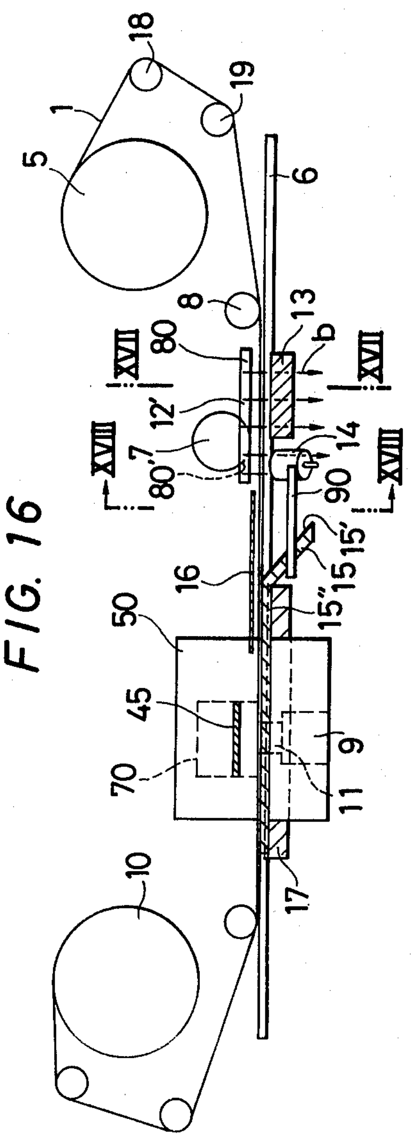
FIG. 16 is a front view outlining the arrangement of another example of the automatic negative film handling device according to the invention.
Figure 17:
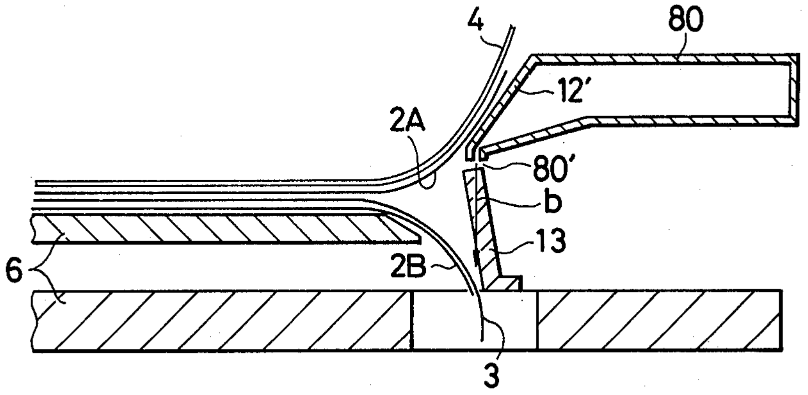
FIG. 17 is a sectional view taken along line XVII—XVII in FIG. 16.
Figure 18:
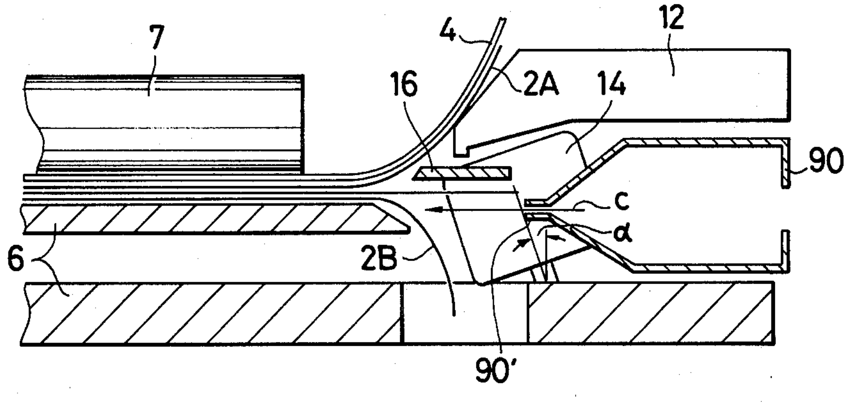
FIG. 18 is also a sectional view taken along line XVIII—XVIII in FIG. 16.

Furthermore, according to the invention, in addition to the guide means 12–17 and 45 adapted for opening the negative sheet and removing and inserting opening to bend the end portion of a negative film piece horizontally, air blowing means 80 and 90 are provided as shown in FIGS. 16 through 18 if required.

The first air box 80 with a first guide plate 12' is disposed substantially parallel to the conveying stand 6 above the edge portion thereof and extending to the direction changing roller 14. The first air box 80 has a plurality of air blowing nozzles 80' arranged in the direction of conveyance of the compound member 1 so as to jet air in the direction of the arrow b. The air box 80 is fixedly secured to the negative sheet conveying stand at one end and is coupled to an air blower through a duct (not shown).

The edge portion of the flexible transparent belt 4 and the negative sheet upper side piece 2A are bent upwardly by the first guide plate 12' forming the upper surface of the air box 80 while the end portion of the negative film piece and the negative sheet lower side piece 2B are bent downwardly by the second guide plate 13 so as to be deflected into the gap between the edge portion of the conveying stand and the second guide plate 13. The second guide plate 13 is so shaped that, as the compound member 1 is conveyed, the end portion of the negative film piece 3 and the negative sheet lower side piece 2B are gradually deflected downwardly. In association with this configuration of the second guide plate, the downward bending of the end portion of the negative film piece 3 and the negative sheet lower side piece 2B is accelerated by the air flow produced by the air flowing nozzles 80' as shown in FIG. 17.

The second air box 90 extends substantially horizontally from the direction changing roller 14 to the sloped surface of the third guide plate 15 in the direction of conveyance of the compound member and is fixedly secured to the conveying stand 6 at one end. The second air box 90 is coupled to an air blower through a duct (not shown). As shown in FIG. 18, the second air box 90 has a plurality of air blowing nozzles 90' directed towards the conveying stand 6. The air flow jetted in the direction of the arrow c maintains only the negative sheet lower side piece 2B bent downwardly. The level of the air blowing nozzles 90' is lower than the position of the end portion of the negative film piece 3 which has been restored horizontally to a level corresponding to the conveying surface of the conveying stand 6 so that the air strikes against only the negative sheet lower side piece 2B.

The operation of the device thus constructed according to the invention will be described in more detail. First, the flexible transparent belt 4 is manually supplied from the magazine 5 and is bent over the first guide plate 12 and then wound on the winding magazine 10. That is, the top end portion of the flexible transparent belt 4 is manually positioned. Thereafter, in response to an operating signal, the flexible transparent belt 4 and the negative sheet upper side piece 2A attached to the belt 4 are separated from the negative film 3 and the negative sheet lower side piece 2B so that they are bent over the first guide plate 12 or 12'. As the compound member 1 is conveyed in the direction of the arrow a, the end portion of the negative film piece 3 and the negative sheet lower side piece 2B are bent downwardly into the gap between the second guide plate and the conveying stand 6 by the second guide plate. If, in this operation, the first air box 80 is provided as shown in FIG. 17, then air is jetted from the air blowing nozzles 80' of the air box 80 in the direction of the arrow b so that the end portion of the negative film piece 3 and the negative sheet lower side piece 2B are maintained bent downwardly.

As the compound member 1 is moved, the end portion of the negative film piece 3 and the negative sheet lower side piece 2B, which have been bent downwardly, pass through the direction changing roll 14 (FIG. 8).

The direction changing roll 14 is in line contact with the end portion of the negative film piece 3 so that damage to the negative film piece 3 is prevented. The negative film end portion and the negative sheet lower side piece are energized in the desired direction by the direction changing roll 14. If, in this operation, the first air box 80 is provided, then air flows are jetted by the air blowing nozzles 80' of the air box 80 in the direction of the arrow b so that the end portion of the negative film piece 3 and the negative sheet lower side piece 2B are maintained bent downwardly.

Immediately after the negative film end portion and the negative sheet lower side piece 2B have passed through the direction changing roll 14, the distance between the direction changing roll 14 and the farthest upstream of the third guide plate 15 is longer than the width of the film. Therefore, in the case where the second air box 90 is provided, the end portion of the negative film piece is energized only by the air flows from the air blowing nozzles 90' of the air box 90 as a result of which the end portion is restored horizontal by its own elastic force. In this operation, the upstream side of the negative sheet lower side piece 2B has been bent downwardly by the direction changing roller 14 and therefore the negative sheet lower side piece 2B at a position corresponding to the end portion of the negative film 3 which has been restored to the horizontal orientation is maintained bent downwardly. In other words, it can be said that the upward returning force of the negative film piece is greater than that of the negative sheet lower side piece 2B. Similarly, if the second air box 90 is provided in this case, then air flows are jetted by the air blowing nozzles 90' thereof in the direction of the arrow c so that the negative sheet lower side piece 2B is positively maintained bent downwardly.

As described before, the end portion of the negative film piece 3 which has just passed through the direction changing roller 14 is restored to the horizontal orientation by its own elasticity. However, the air blowing nozzles 90' of the second air box 90 blow air which prevents the restoration of the end portion. Accordingly, the amount and rate of air jetted by the air blowing nozzles 90' must be limited to the extent that the negative film can be restored by its owing elasticity and so that downward bending of the negative sheet lower side piece 2B is facilitated.

The end portion of the negative film piece 3 which has been released from the direction changing roller 14 is allowed to leap up towards the fourth guide plate 16 by force of its own elasticity. The fourth guide plate 16 prevents excessive leaping of the end portion of the negative film piece 3 and is effective especially for a negative film piece 3 which tends to twist upwardly in a curl.

As the compound member 1 is moved, the end portion of the negative film piece 3 passes over the third guide plate 15. As was described before, the end portion of the negative film piece 3 is restored to the horizontal orientation by force of its own elasticity when released from the direction changing roll 14. However, if the negative film piece 3 has a nature which causes it to twist it downwardly, then restoration cannot be expected. The farthest upstream end of the third guide plate 15 is below the lowermost end portion of the negative film piece 3 bent downwardly. Therefore, even if the negative film piece tends to twist downwardly, it is guided over the sloped surface of the third guide plate 15 and is finally introduced over the horizontal portion of the third guide plate 15. In this operation, the negative sheet lower side piece 2B is maintained bent downwardly between the third guide plate 15 and the fifth guide plate 17. The edge portion of the flexible transparent belt 4 and the negative sheet upper side piece 2A are bent upwardly by the relatively long first guide plate 12. The bend of the upstream portions thereof is propagated even after passing through the first guide plate 12. In accordance with the invention, the sixth guide plate 45 is provided at the same level as the first guide plate 12 so that the edge portion of the flexible transparent belt 4 and the negative sheet upper side piece 2A are bent together. In the negative film removing position regulating section 9, the negative sheet upper side piece 2A and the negative sheet lower side piece 2B are completely separated from each other thereby making it simple to insert the negative film piece after the negative film piece taken out of the negative sheet has been printed.

The upstream portion of the negative sheet lower side piece 2B bent downwardly between the third guide plate 15 and the fifth guide plate 17 is bent downwardly by the air flows jetted by the air blowing nozzles 90' of the second air box 90 and the air flows from the air blowing nozzles 80′ of the first air box 80 and by the second guide plate 13 and the direction changing roller 14 maintaining it bent downwardly between the third guide plate 15 and the fifth guide plate 17.

With the invention, instead of the second guide plate 13, a plurality of rollers may be juxtaposed. The positional relationships of the guide plates, the direction changing roller and the air blowing nozzles may be such that the upper side piece and the lower side piece of the negative sheet are separated from each other thereby to provide the opening.

Information representative of each picture of each negative film piece inserted into the respective pockets of the negative sheet is applied to a first detector (not shown). When a particular negative film piece 3 comes near the entrance of the negative film conveying path 11 as the negative sheet 2 attached to the flexible transparent belt 4 is conveyed in the direction of the arrow a along the conveying stand 6, the conveyance operation is suspended in response to the information applied to the first detector. During this time period, the upper side piece 2A and the lower side piece 2B of the negative sheet are separated from each other by the guide plate 12 (12′), 13, 15, 16 and 17 and the direction changing roller 14, as a result of which the end portion of the negative film piece 3 protrudes from and is exposed through the opening formed by the separated side pieces 2A and 2B. In the case that the upper side piece 2A and the lower side piece 2B of the negative sheet 2 are not separated from each other and accordingly the end portion of the negative film piece 3 does not protrude and is not exposed, this situation is detected by a second detector (not shown). When the film causing the problem reaches the position at which adjacent downstream sides of the film reach the entrance of the negative film conveying path 11, an alarm indication is given so that conveyance in the direction of the arrow a is automatically stopped.

After the separation of the upper and lower side pieces 2A and 2B has been correctly carried out, at a predetermined position, a negative film piece to be printed is detected by the first detector and it is stopped near the entrance of the negative film conveying path 11.

At this point, the negative film removing position regulating device 9 operates to control the negative film piece so that the end portion of the negative film piece is parallel to the negative film conveying path 11 and is in alignment with the longitudinal center line of the negative film conveying path. That is, it gives initial orientation to the negative film piece so that the negative film piece is correctly delivered to the negative film carrier 50. After the compound member 1 being conveyed on the conveying stand 6 in the direction of the arrow a has passed through the direction changing roller 14, the end portion of the negative film piece is extended from the opening formed by the separated upper and lower side pieces 2A and 2B of the negative sheet. If, under this condition, the negative film piece were to be further conveyed in the direction of the arrow, the protruding surface of the negative film piece 3 would meet resistance from the conveying stand 6 as a result of which the negative film piece would move towards the upstream side in the pocket of the negative sheet. Thus, the provision of a negative film removing position regulating device in accordance with the invention is considerably effective.

When the end portion of the negative film piece 3 is stopped near the entrance of the negative film conveying path 11, the rotary solenoid is energized so as to rotate the guide plate 22 fixedly secured to the rotary solenoid. As the guide plate 22 turns, the steel ball 26 in the recess 25 of the protruding part 24 of the guide plate slidably moves on the cam surface 28′ of the cam 28 towards the right as shown in FIG. 12 depressing the sloped surface of the cam surface 28′. As a result, the table 29 provided integrally with the cam 28 is gradually lifted along the supporting members 31 and accordingly the slide plates 20 below the negative film conveying surface of the negative film conveying path 11 are raised above the negative film conveying surface. While the slide plates 20 are being lifted, the engaging rods 35 integral with the sliders 33 which are slidably engaged with the arcuate holes 27 formed in the guide plate 22 slide from the range of $\alpha_1$ into the range of $\alpha_2$ as seen in FIG. 9 by rotation of the guide plate 22. Accordingly, the distance between the slide plates 20 changes from $L_1$ to $L_2$ against the elastic force of the compression spring 39. Thus, when the slide plates 20 protrude over the negative film conveying path 11, the end portion of the negative film piece is held by the slide plates 20 and is in alignment with the negative film conveying path longitudinal center line and parallel to the conveying path. More specifically, while the solenoid 21 turns through about 95° as shown in FIG. 13, the pair of slide plates 20 lifts towards the center line of the negative film conveying path 11 and simultaneously the distance between the slide plates 20 is reduced to the width of the negative film so that the end portion of the negative film piece is positioned in alignment with the center line of the negative film conveying path. Thereafter, the slide plates 20 are spaced apart from each other and returned to their positions below the negative film conveying path 11 due to a lowering force provided by a restoring spring (not shown) of the rotary solenoid and the compression spring 39 between the sliders 33.

The negative film removing and inserting device 70 operates to take the end portion of a negative film piece, which is positioned by the negative film removing position regulating device 9, to the negative film conveying path 11 and to insert a negative film piece which has been utilized in printing.

The removing and inserting roller 42 is rotated by the operation of the drive section 54 while the press member 41 is lowered by the operation of the solenoid 40. As a result, the end portion of a negative film piece positioned by the negative film removing position regulating device 9 is held by the removing and inserting roller 42 and the press member 41 and the negative film piece is delivered towards the negative film carrier by cooperation of the feed rollers 43 44. After printing, the negative film piece is inserted into the negative sheet by reverse rotation of the feed rollers 43 and 44 and the removing and inserting roller 42.

The negative film piece 3 moving onto the negative film conveying path 11 passes over the negative film picture notch detecting section 51. The detecting section 51 operates to produce a signal corresponding to the width of a frame and the position of the frame with this signal coupled to the film delivery drive section 52 as a result of which a film picture to be printed is placed on the masking section 53 and is then subjected to exposure. In this operation, the negative film picture is printed by an optical system (not shown) upon a roll of photographic paper (not shown) which is conveyed in the same direction as the negative film piece and parallel to the negative film picture. After exposure, the negative film delivery drive means and the rollers in the negative film conveying path 11 are rotated in the opposite direction so as to insert the negative film piece into the negative sheet. Thereafter, the following negative film piece on the downstream side on the conveying stand 6 is conveyed to a position near the entrance of the negative film conveying path moving in the direction of the arrow a by the rotation of the drive roller 7 and associated driving components. In this manner, the above-described operation is repeatedly carried out.

Should it be desired to manually carry out the above-described printing, the automatic negative film carrier may be slid back along the guide plates 56 and after which the manual negative film carrier is set on the carrier plate 58.

While there has been described a preferred embodiment of the invention, it will be obvious to those skilled in the art that various changes and modifications can be made thereto without departing from the invention.

What is claimed is:

1. A negative film handling method comprising the steps of: inserting negative films into inserting and removing openings in negative sheets, positioning said negative sheets and attaching said negative sheets side-by-side on a flexible transparent belt in such a manner that said negative film inserting and removing openings of said negative sheets are aligned with one another perpendicularly to the negative film inserting and removing direction, and opening said negative film inserting and removing openings of said negative sheets including bending at least an edge portion of said flexible transparent belt.

2. The method as claimed in claim 1 further comprising the step of conveying said belt, said edge portion of said flexible transparent belt being bent while said flexible transparent belt is being conveyed.

3. The method as claimed in claim 1 wherein in said step of attaching said negative sheets to said flexible transparent belt, at least one portion near said negative film inserting and removing opening of each negative sheet is attached.

4. The method as claimed in claim 1 further comprising the step of joining a side portion of the negative film inserting and removing opening of a negative sheet on the unattached side of said negative sheet to a side portion of a negative film inserting and removing opening of an adjacent negative sheet on the unattached side of said adjacent negative sheet.

5. The method as claimed in claim 1 wherein said opening step comprises integrally separating said flexible transparent belt and an upper side portion of said negative sheet from said negative film and a lower side portion of said negative sheet and separating said negative sheet lower side portion from said negative film whereby said negative film inserting and removing openings formed by said upper and lower side portions of said negative sheets are successively opened.

6. The method as claimed in claim 5 wherein said opening step comprises bending said edge portion of said flexible transparent belt and said upper side portion of said negative sheet upwardly as a single unit while bending said end portion of said negative film and said lower side portion of said negative sheet downwardly and guiding said end portion of said negative film to an original position while maintaining bent said lower side portion of said negative sheet wherein at a negative film removing and inserting position said negative film inserting and removing opening formed by said upper and lower side portions of said negative sheet is opened.

7. The method as claimed in claim 6 wherein said opening step comprises bending while conveying said flexible transparent belt and said negative sheets containing said negative films said edge portion of said flexible transparent belt and said upper side piece of each negative sheet upwardly as a single unit while bending said end portion of each negative film and the lower side piece of each negative sheet downwardly, guiding said end portion of each negative film to said original position while maintaining bent said lower side portion of each negative sheet wherein at a negative film removing and inserting position said negative film inserting and removing opening formed by said upper and lower side portions of each negative sheet is opened.

8. The method as claimed in claim 1 further comprising the steps of bending said flexible transparent belt and an upper side portion of said negative sheet upwardly as a single unit while bending an end portion of said negative film and a lower side portion of said negative sheet downwardly, simultaneously blowing air on said end portion of said negative film to maintain said end portion of said negative film and said lower side portion of said negative sheet bent downwardly, and guiding said end portion of said negative film to an original position thereof while blowing air on said lower side portion of said negative sheet to maintain said lower side portion of said negative sheet bent downwardly to open said negative film inserting and removing opening formed by said upper and lower side portions of said negative sheet.

9. The method as claimed in claim 8 wherein said opening step comprises bending while conveying said flexible transparent belt and said negative sheets containing said negative films said flexible transparent belt and said upper side portion of each negative sheet upwardly as a single unit while bending said end portion of each negative film and said lower portion of each negative sheet downwardly, simultaneously blowing air on said end portion of each negative film to maintain said end portion of each negative film and said lower side portion of each negative sheet bent downwardly, guiding said end portion of each negative film to an original position thereof while blowing air on said lower side portion of each negative sheet to maintain said lower side portion of each negative sheet bent downwardly to open said negative film inserting and removing opening formed by said upper and lower side portions of each negative sheet.

10. An automatic negative film handling apparatus in which negative sheets into which negative films are inserted are attached side-by-side on a flexible transparent belt in such a manner that negative film inserting and removing openings of said negative sheets are aligned with one another perpendicularly to the negative film inserting and removing direction, which apparatus comprises:

(a) negative sheet conveying means for intermittently conveying said negative sheets which contain said negative films and are attached to said flexible transparent belt;

(b) negative sheet opening means for bending upwardly an upper side portion on the negative film inserting and removing opening side of each negative sheet and one edge portion on the negative film inserting and removing opening side of said flexible transparent belt and for bending a lower side portion of each negative sheet downwardly to open said negative film inserting and removing opening thereby to separate the end portion of each negative film from said negative film inserting and removing opening;

(c) negative film conveying path forming means disposed perpendicularly to the direction of conveyance of said negative sheets for conveying each negative film to a printing opening section;

(d) negative film removing position regulating means for, while said negative film inserting and removing opening is opened so as to be separated from the end portion of said negative film, bringing into coincidence the longitudinal center line of said negative film with the longitudinal center line of said negative film conveying path forming means;

(e) negative film removing and inserting means for moving said negative film thus positioned onto said negative film conveying path and inserting said negative film into said negative sheet after printing;

(f) negative film picture detection notch detecting means including means for detecting a picture of said negative film for feeding said negative film as required to said printing opening section; and (g) negative film feeding means operated in accordance with a signal produced by said negative film picture detection notch detecting means for feeding said negative film uniformly to said printing opening section.

11. The apparatus as claimed in claim 10 wherein said negative film conveying path forming means, said negative film removing and inserting means, said negative film picture detection notch detecting means and said negative film feeding means are constructed as an automatic negative film carrier movable as a single unit.

12. The apparatus as claimed in claim 10 wherein said negative sheet opening means comprises a plurality of guide plates and at least one roller, said guide plates and said roller being disposed along an edge on said negative film inserting and removing opening side of said negative sheet feeding means.

13. The apparatus as claimed in claim 10 or 12 wherein said negative sheet opening device further comprises air blowing means for maintaining said lower side portion of said negative sheet bent downwardly.

14. The apparatus as claimed in claim 10 wherein said negative sheet feeding means comprises a conveying stand having at least one groove on an extension of said negative film conveying path, said groove having a width larger than the width of said negative film.

15. The apparatus as claimed in claim 12 further comprising first guide means for bending upwardly said edge portion of said flexible transparent belt and said upper side portion of said negative sheet, second guide means for bending downwardly said lower side portion of said negative sheet and said end portion of said negative film, and third guide means provided downstream of said second guide means for guiding only a horizontal return of said end portion of said negative film, each of said guide means being provided near an edge portion of a conveying stand between a negative sheet supplying section and a negative sheet winding section.

16. The apparatus as claimed in claim 15 wherein said first guide means comprises a first guide plate disposed near said edge portion of said conveying stand and above said conveying stand.

17. The apparatus as claimed in claim 16 wherein said second guide means comprises a second a guide plate confronting said edge portion of said conveying stand disposed below said first guide plate and a direction changing roller provided downstream of said second guide plate.

18. The apparatus as claimed in claim 16 wherein said third guide means comprises a third guide plate having a sloped surface, said third guide plate being spaced by a distance equal at least to the width of said negative film from said direction changing roller, a fourth guide plate extending from a position approximately immediately downstream of said direction changing roller towards the downstream side, the level of said fourth guide plate being equal to a level between the level of said first guide plate and the level of said conveying stand, and a fifth guide plate provided at a negative film inserting and removing position.

19. The apparatus as claimed in claim 17 wherein said third guide means comprises a third guide plate having a sloped surface, said third guide plate being spaced by a distance equal at least to the width of said negative film from said direction changing roller, a fourth guide plate extending from a position approximately immediately downstream of said direction changing roller towards the downstream side, the level of said fourth guide plate being equal to a level between the level of said first guide plate and the level of said conveying stand, and a fifth guide plate provided at a negative film inserting and removing position.

20. The apparatus as claimed in claim 18 or 19 wherein said third guide plate extends to said negative film inserting and removing position and confronts said fifth guide plate.

21. The apparatus as claimed in claim 12 further comprising first guide means for bending upwardly said edge portion of said flexible transparent belt and said upper side piece of said negative sheet, second guide means for bending downwardly said lower side piece of said negative sheet and said end portion of said negative film, a first air box integral with said first guide means for blowing air substantially downwardly, third guide means provided downstream of said second guide means to guide only a horizontal return of the end portion of said negative film, and a second air box provided near said second and third guide means to blow air towards a conveying stand between a negative sheet supplying section and a negative sheet winding section, said guide means and said air boxes being provided near an edge portion of said conveying stand.

22. The apparatus as claimed in claim 21 wherein said first guide means comprises a first guide plate disposed near said edge portion of said conveying stand and above said conveying stand and forming an upper surface of said first air box.

23. The apparatus as claimed in claim 22 wherein said second guide means comprises a second guide plate confronting said edge portion of said conveying stand, said second guide means being disposed below said first guide plate, and a direction changing roller provided downstream of said second guide plate.

24. The apparatus claimed in claim 22 wherein said third guide means comprises a third guide plate having a sloped surface, said third guide plate being spaced by a distance equal at least to the width of said negative film from said direction changing roller, a fourth guide plate extending from a position approximately immediately downstream of said direction changing roller towards the downstream side, the level of said fourth guide plate being substantially equal to a level between the level of said first guide plate and the level of said conveying stand, and a fifth guide plate provided at a negative film inserting and removing position.

25. The apparatus as claimed in claim 23 wherein said third guide plate extends to said negative film inserting and removing position and confronting said fifth guide plate.

26. The apparatus as claimed in claim 24 wherein said second air box is arranged between said direction changing roller and said sloped surface of said third guide plate and wherein said second air box comprises a plurality of air blowing nozzles.

27. The apparatus as claimed in claim 10 wherein said negative film removing position regulating device comprises a pair of slide plates and means for lifting said slide plates above said negative film conveying path and for moving said slide plates in the direction of conveyance of negative films for reducing the distance between said pair of slide plates to the width of said negative film, said lifting and moving means operating when said end portion of said negative film is protrudes from said negative sheet.

* * * * *